United States Patent [19]
Wilkins et al.

[11] Patent Number: 4,474,381
[45] Date of Patent: Oct. 2, 1984

[54] METAL PIPE JOINT SEAL RING WITH PORT TO CONTROL EROSION

[75] Inventors: Robert L. Wilkins; Eugene J. Cegielski, both of Houston; James P. McEver, Cypress; Edward J. Szymczak, Spring, all of Tex.

[73] Assignee: Cameron Iron Works, Inc., Houston, Tex.

[21] Appl. No.: 489,495

[22] Filed: Apr. 28, 1983

[51] Int. Cl.³ .................. F16L 57/00; F16L 25/00; F16J 15/08
[52] U.S. Cl. .................. 277/207 A; 277/236; 277/237 R; 285/14; 285/96; 285/106; 285/334.2
[58] Field of Search ............ 285/14, 96, 106, 334.2; 277/207 A, 207 R, 207 B, 236, 29, 237, 24

[56] References Cited

U.S. PATENT DOCUMENTS

| 2,760,673 | 8/1956 | Laurent | 285/96 X |
| 3,404,902 | 10/1968 | Latham et al. | 285/14 |
| 4,214,763 | 7/1980 | Latham et al. | 277/236 X |

FOREIGN PATENT DOCUMENTS

| 969600 | 7/1958 | Fed. Rep. of Germany | 285/334.2 |
| 1118550 | 11/1961 | Fed. Rep. of Germany | 285/14 |
| 2025555A | 1/1980 | United Kingdom | 285/334.2 |

Primary Examiner—Robert S. Ward
Attorney, Agent, or Firm—Vinson & Elkins

[57] ABSTRACT

A tubular joint having two tubular members having an inner end tapered to provide sealing surfaces, means for joining the tubular members together with the tapered end surfaces adjoining each other, and a seal ring having an inner surface and tapered outer surfaces mating with the tapers of the tapered end surfaces and at least one port through the ring from the mid point of one of its tapered outer surfaces to its inner surface.

11 Claims, 5 Drawing Figures

METAL PIPE JOINT SEAL RING WITH PORT TO CONTROL EROSION

BACKGROUND

Tubular joints in the past have used a variety of configurations and seals. Some joints have had a tapered sealing surface on the interior of the end of each tubular member and included a metal seal ring which has a triangular cross-section with the base of the triangle being the inner surface of the ring and forming the extension of the interior of the tubular members.

In one type of flanged joint of the prior art as disclosed in U.S. Pat. No. 1,567,813, the ring gasket or seal ring is provided with upper and lower annular grooves which are in communication with each other by means of axial holes drilled through the ring and also are in communication with the interior of the pipe joint through radial holes drilled from the central interior of the ring into the axial holes. The patent asserts that the joint pressure is conducted to the annular grooves to cause the ring to be wedged more tightly into the sealing grooves in the face of the flanges.

One of the problems with this joint in tubular well members is the problem of erosion or cutting of the tapered seat surface of the tubular member when the joint develops a leak. Correction of the leak requires resurfacing of the tapered sealing surface of the tubular member and replacement of the seal ring. Sometimes the lower tubular member is the one which requires resurfacing. Recovery of such lower member from a well is expensive and time consuming. The alternative is to remachine the tapered surface in the well which is also difficult and expensive.

SUMMARY

The present invention relates to an improved tubular joint and an improved seal ring therefor. The improved joint includes two tubular members each having an outwardly flaring inner sealing surface at their adjoining ends, means joining the tubular members with their flared sealing surfaces adjoining each other, and a seal ring having an axial inner surface and tapered upper and lower outer surfaces for mating with the tapered surfaces of the tubular members, and the seal ring having a groove and ports extending through said seal ring from the groove which is positioned midway of at least one of its outer tapered surfaces to the interior of the ring.

An object of the present invention is to provide an improved tubular joint which is reusable after having an eroding type of leak.

A further object is to provide an improved sealed tubular joint for a well having control of the path of any leakage which may occur between the seal ring and one of the tubular member.

Another object is to provide an improved tubular joint for use in a well with an improved metal seal ring which does not require reworking of the tapered sealing surface of the tubular member even after an eroding leak develops in the joint between the seal ring and the tapered sealing surface of the tubular member.

BRIEF DESCRIPTION OF THE DRAWINGS

These and other objects and advantages are hereinafter set forth and explained with reference to the drawings wherein.

DESCRIPTION OF THE PREFERRED EMBODIMENT

Figure 1:
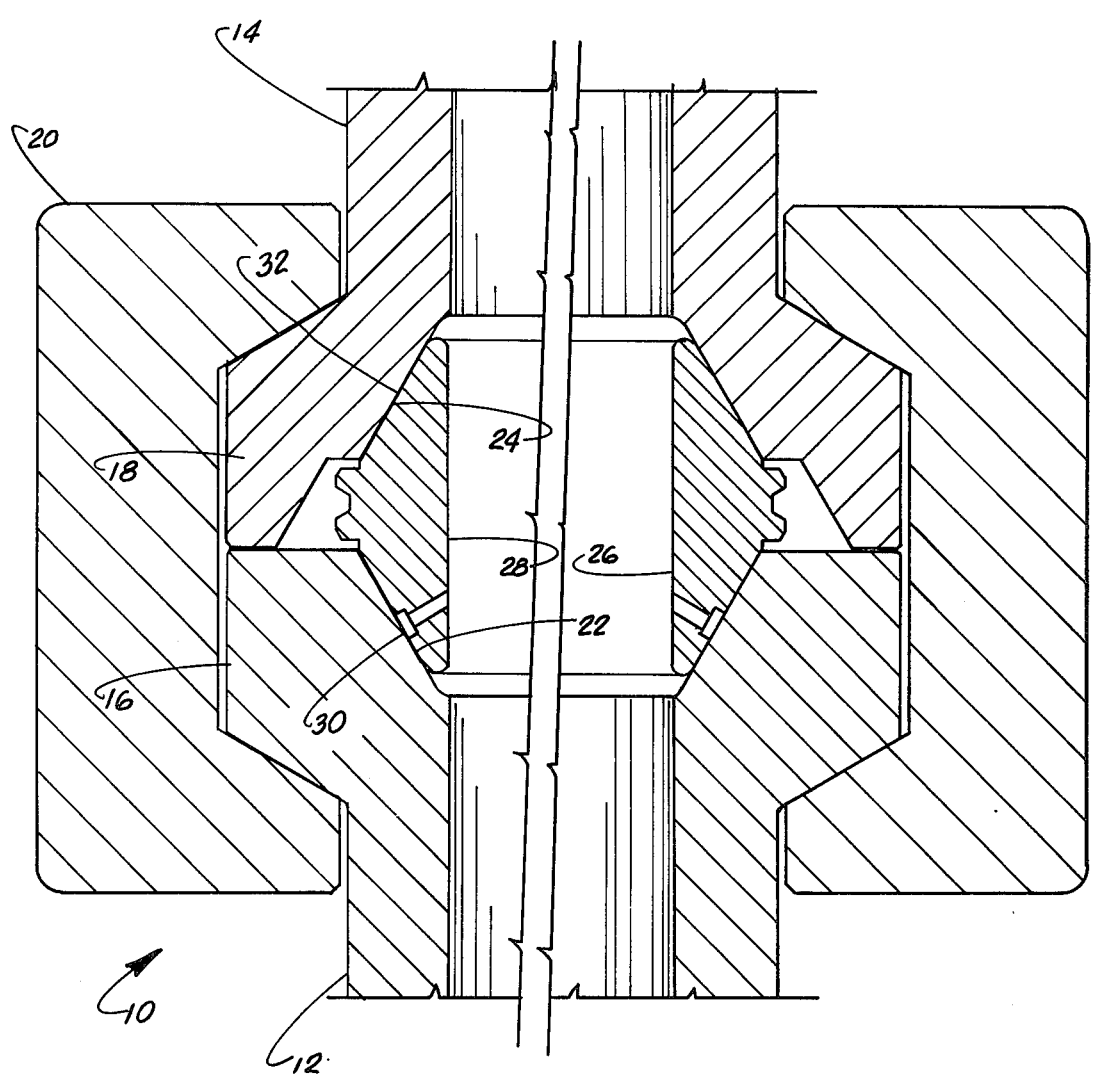
FIG. 1 is a partial axial cross section of the improved joint of the present invention.

Tubular joint 10 of the present invention is shown in FIG. 1, and includes tubular members 12 and 14 having flanges 16 and 18 which are secured together by clamp 20 of a known design. The interior adjacent ends of tubular members 12 and 14 are tapered at 22 and 24 to provide sealing surfaces and seal ring 26 is positioned between members 12 and 14. The inner surface 28 of seal ring 26 is an axial surface and is parallel to and aligned with the inner surfaces of members 12 and 14. Seal ring 26 is generally triangular in section and its other two sides 30 and 32 are tapered and mate with surfaces 22 and 24 to ensure sealing engagement of seal ring 26 therewith as clamp 20 is tightened to bring flanges 16 and 18 and tubular members 12 and 14 together.

Figure 4:
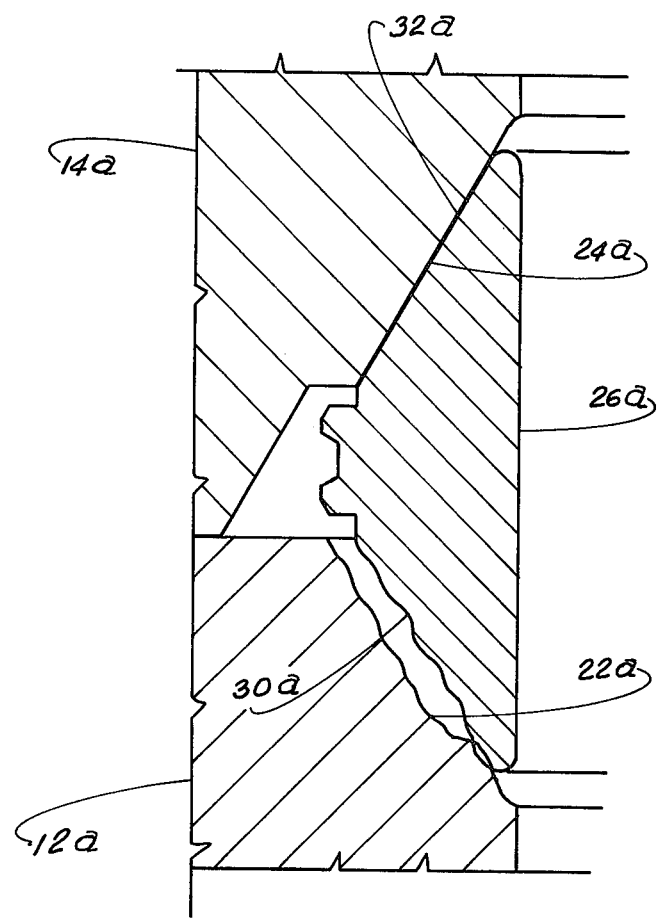
FIG. 4 is a partial sectional view of a tubular joint of the prior art illustrating leakage erosion.

Seal ring 26 as described above is substantially similar to seal ring 26a of the prior art as shown in FIG. 4. The components of seal ring 26a of the prior art are given the same numbers in FIG. 4 as the components of seal ring 26 of the present invention with all components of seal ring 26a having the postscript "a" following their number designations.

Figure 2:
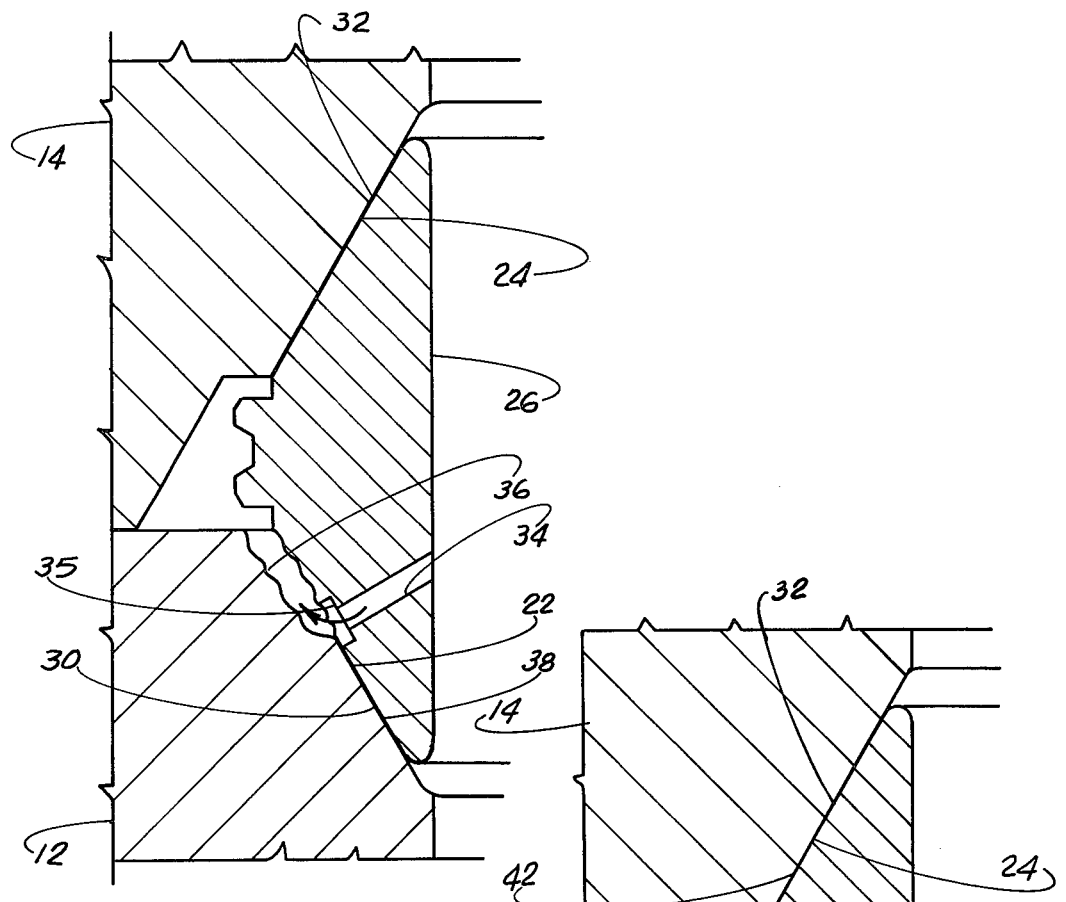
FIG. 2 is a partial sectional view illustrating an eroding leak in the joint of the present invention.
Figure 3:
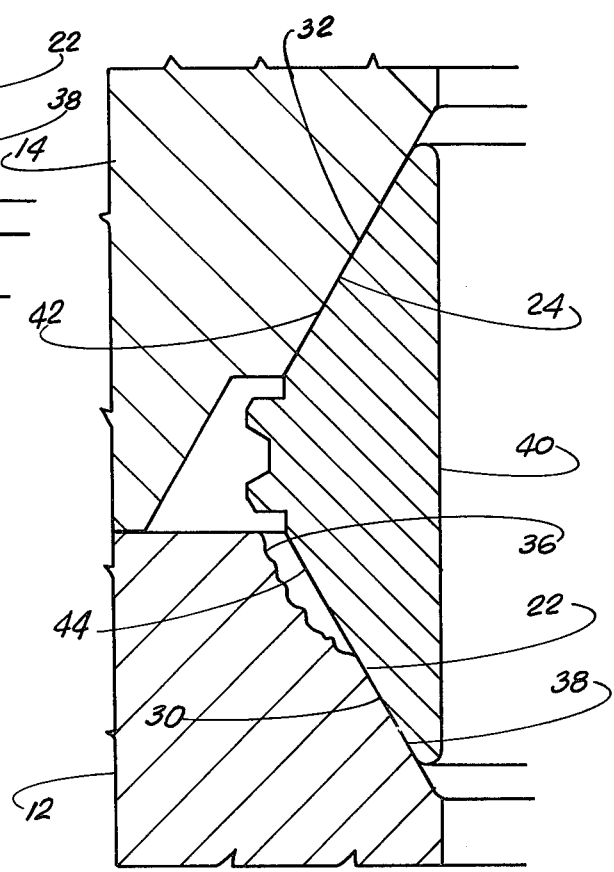
FIG. 3 is a partial sectional view showing the joint of FIG. 2 repaired and sealing.

The difference between seal ring 26 and seal ring 26a of the prior art is that means is provided to establish communication between a position midway on lower surface 30 to inner surface 28. Such communication means includes ports 34 which extend from groove 35 which is positioned midway of surface 30 through ring 26 to surface 28 as shown. With tubular joint 10 completed as shown a leak therein which develops between surface 22 and 30 is a controlled washout or erosion on surfaces 22 and 30 down to the level of groove 35. As shown in FIGS. 2 and 3, surface 22 includes eroded surface 36 and undamaged surface 38. Since surface 38 is undamaged, seal ring 26 can be removed and seal ring 40 which is a prior art seal ring similar to seal ring 26a in that it does not include ports 34 and groove 35 is installed in position between members 12 and 14. Seal ring 40 includes sealing surfaces 42 and 44. When installed, surface 42 seals against surface 24 and surface 44 seals against undamaged surface portion 38 of surface 22 as shown in FIG. 3.

Figure 5:
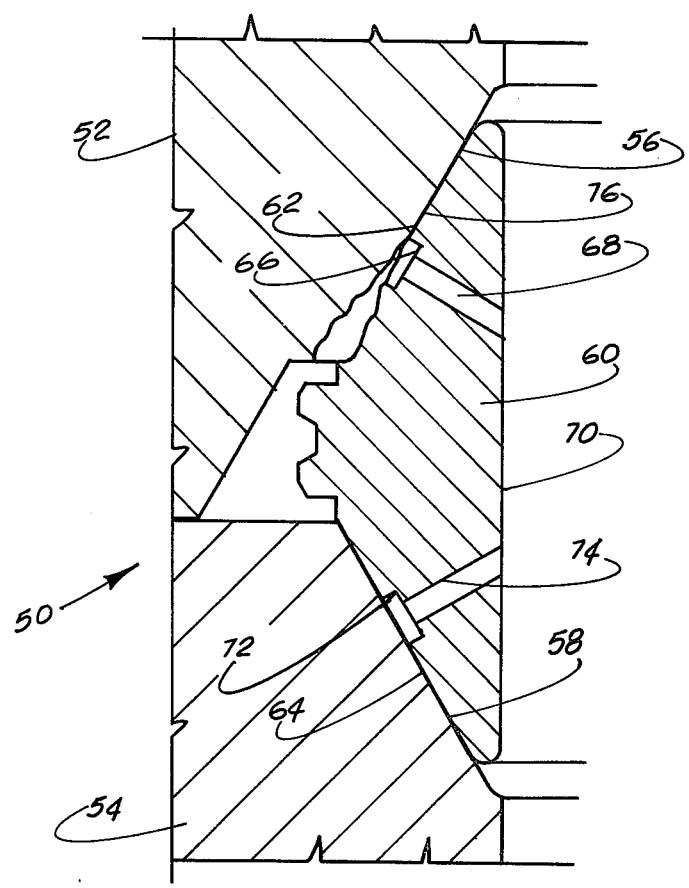
FIG. 5 is a partial sectional view of a modified form of the improved joint of the present invention.

The joint 50 shown in FIG. 5 includes tubular members 52 and 54 having their adjoining ends prepared to have tapered sealing surfaces 56 and 58 respectively and seal ring 60 which is generally triangular in shape and includes outer tapered surfaces 62 and 64 which mate with sealing surfaces 56 and 58 as shown to provide the joint seal. Groove 66 is positioned midway in surface 62 and port 68 extends from groove 66 to inner surface 70 of seal ring 60. Groove 72 is positioned midway in surface 64 and port 74 extends from groove 72 to inner surface 70 of seal ring 60.

When joint 50 is subjected to erosion it is only necessary to remove seal ring 60 and replace it with a prior art seal ring which will seal against undamaged tapered sealing surface 58 and against undamaged portion 76 of sealing surface 56.

Thus, by controlling the flow of any leak, the erosion of the sealing surface of the tubular members is controlled and the joint may be reassembled as a sealed joint without resurfacing the eroded sealing surface.

With seal ring 26 care should be taken in its installation so that groove 35 and ports 34 are on the lower outer surface. This allows the joint to be resealed as described above without reworking tapered surface 22. With seal ring 60 it may be installed in either position and no reworking is required to reseal the joint.

What is claimed is:

1. A tubular joint comprising
a first tubular member having its inner end surface tapered,
a second tubular member having its inner end surface tapered,
means for joining the first and second tubular members together with their tapered ends adjoining, and
a seal ring positioned between the tubular members having an inner axial surface and tapered outer surfaces angled to seal on the tapered ends,
at least one port extending through said seal ring from the mid point of one of its tapered outer surfaces to its inner surface.

2. A tubular joint according to claim 1 wherein
said seal ring has a triangular cross-section with its inner surface being the base and its tapered surfaces being of substantially equal length.

3. A tubular joint according to claim 1 including
a groove at the mid point in one of the tapered outer surface of said seal ring in communication with said port.

4. A tubular joint according to claim 3 including
a plurality of ports extending from said groove to said inner surface.

5. A tubular joint according to claim 1 including
at least one port extending through said seal ring from the mid point of each of its outer tapered surfaces to its inner surface.

6. A tubular joint according to claim 5 including
a groove positioned midway on the upper outer surface of said seal ring,
a groove positioned midway on the lower outer surface of said seal ring, and
a plurality of ports extending through said seal ring from each of said grooves.

7. A tubular joint for a well comprising
a lower tubular member positioned in a well and having its upper inner end surface tapered,
an upper tubular member having its lower inner end surface tapered,
means for joining the first and second tubular members together with their tapered ends adjoining,
a seal ring, positioned between the tubular members, having an inner axial surface and tapered outer surfaces angled to seal on the tapered end surfaces of the tubular members, and
means for establishing communication through said ring from a level midway on its lower outer surface to its inner axial surface.

8. A seal ring for a tubular joint comprising
an annular member having an inner axial surface and tapered outer surfaces with at least one port extending from said inner surface to the mid point of one of the tapered outer surfaces.

9. A seal ring according to claim 8 wherein
said annular member has an axial cross sectional shape with equal length tapered surfaces.

10. A seal ring according to claim 8 including
at least one port extending through said seal ring from the mid point of each of its outer tapered surfaces to its inner surface.

11. A seal ring according to claim 10 including
a groove positioned midway on the upper outer surface of said seal ring,
a groove positioned midway on the lower outer surface of said seal ring, and
a plurality of ports extending through said seal ring from each of said grooves.

* * * * *